Dec. 6, 1966   J. J. JESTER   3,289,708
PICKER STICK CHECKING DEVICE
Filed Oct. 12, 1964
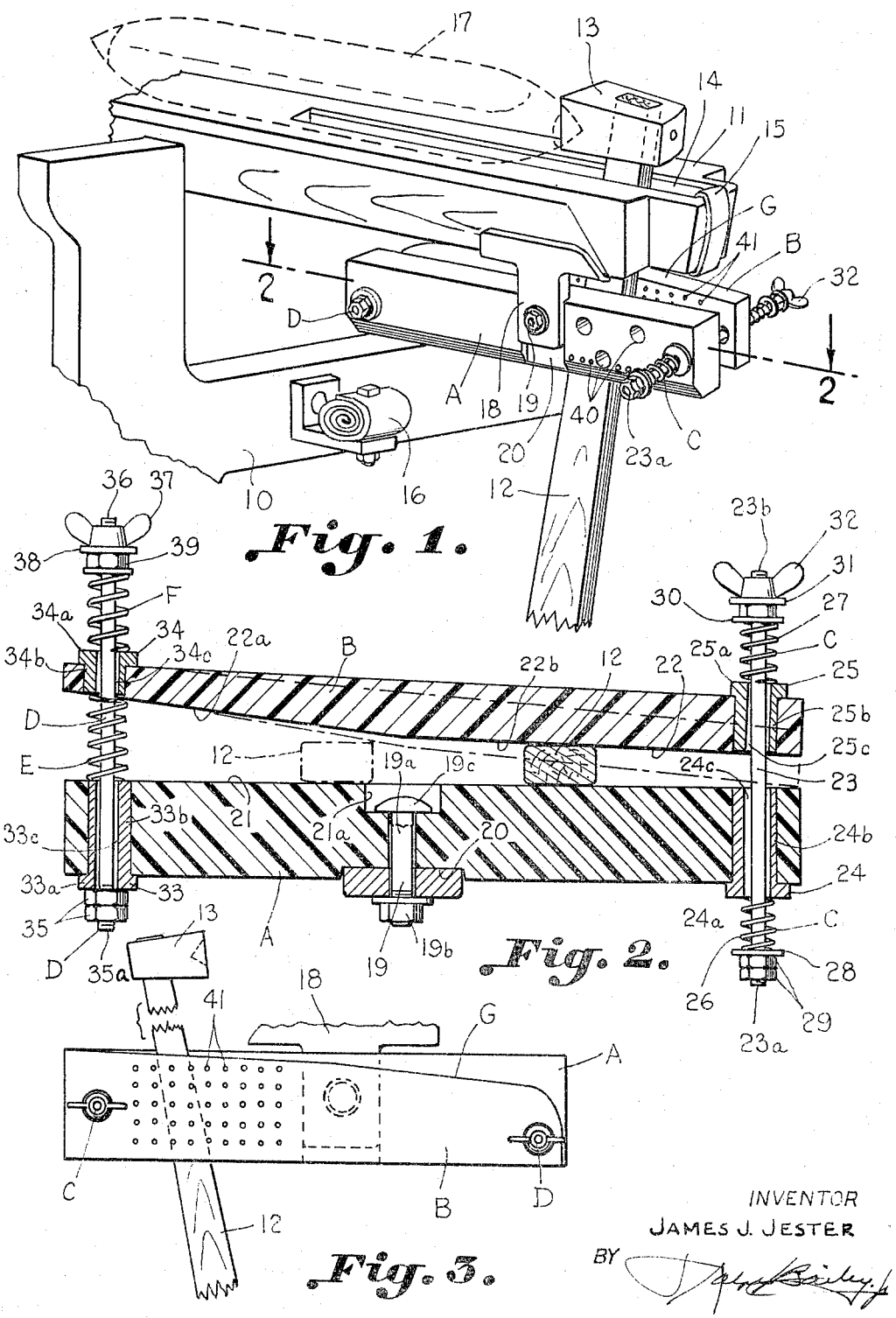
INVENTOR
JAMES J. JESTER
ATTORNEY United States Patent Office 3,289,708
Patented Dec. 6, 1966

3,289,708
PICKER STICK CHECKING DEVICE
James J. Jester, 118 Kathryn Court, Greenville, S.C.
Filed Oct. 12, 1964, Ser. No. 403,268
8 Claims. (Cl. 139—164)

This invention relates to a novel shuttle propelling or picker stick checking device capable of more uniform checking at higher loom speeds.

Devices of every conceivable kind have been provided with a view to eliminating the leather check strap normally used on looms. The provision of an improved checking means has become more important as a result of increased loom speeds. It has been found, using a device constructed according to the present invention, that a loom speed of 210 picks per minute has been made possible over extended periods of time. Devices proposed heretofore have included the use of substantially parallel aligned members which have been spring biased together by various means. The subject invention contemplates positioning elongated elements with resilient means urging the outside end portions together, the other ends being spring biased open but resisting forces tending to laterally displace the members outwardly relative to each other. The force of the checking action is carefully controlled and increases progressively as the stick moves outwardly on a checking operation. This may be accomplished by several means used in concert to produce a device capable of delicate adjustment and of maintaining uniform checking action at high speeds over extended periods of time.

Accordingly, an important object of this invention is to make possible increased loom speeds through the use of improved checking mechanisms.

Another important object of the invention is to provide a checking device capable of delicate adjustment, and which will provide uniform checking action over extended periods of time.

Still another object of the invention is the provision of a checking device which is capable of providing progressively increased checking action as the picker stick moves outwardly on a checking stroke.

Another object of the invention is to provide an adjustable checking device, capable of being readily mounted upon the lay, the stroke of which is capable of infinite adjustment.

Another important object of the invention is to provide a checking device wherein the area thereof contacting the picker stick is increased as the picker sticks moves outwardly on a checking stroke.

Another important object of the invention is to provide a checking device wherein the checking force is exerted upon the picker stick in a progressively higher plane as the picker stick moves outwardly on a checking stroke.

Still another important advantage is the elimination of the check strap and its attendant disadvantages.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a checking device constructed in accordance with the present invention positioned upon a loom, FIGURE 2 is an enlarged sectional elevation taken on the line 2—2 in FIGURE 1, and FIGURE 3 is a side elevation at a reduced scale looking from the rear of FIGURE 1.

The drawing illustrates a picker stick checking device for a loom including a pair of elongated members A and B presenting opposed inner faces for applying checking action to the picker stick. Means C resiliently urging said members toward each other are positioned adjacent the outer ends thereof. One of the members has rigid connection with the lay. An elongated shank D passes transversely through both members adjacent the inner ends thereof. A first coil spring E is carried by the shank intermediate said members urging said members to open position. A second coil spring F is carried upon the shank outside the member opposite the member having rigid connection with the lay urging said member opposite against the force of the first coil spring. A more uniform checking action results since the inner end of the members are initially urged apart by the picker stick against the second coil spring leaving the resilient means C for maintaining checking action.

Means are provided for progressively increasing checking action as the picker stick moves further toward the outer ends of the members on a checking stroke. Such means include providing the member opposite with a tapering depth decreasing progressively from the outer ends thereof toward the inner end as illustrated by the tapered surface G. Such means also contemplates positioning the elements D, E and F substantially below the horizontal plane of the resilient means C. The checking stroke may be adjusted by adjusting the springs E and F.

Referring more particularly to FIGURE 1, the frame of a loom of standard construction is illustrated at 10. The lay of such a loom is illustrated at 11 and the picker stick 12 carrying the picker 13 moves back and forth during weaving within the lay slot 14 on checking and picking strokes, respectively. The lay end bumper for limiting outward movement of the picker stick is illustrated at 15 and a bumper 16 of standard design is carried by the frame 10 for limiting the inner movement of the picker stick on a picking or power stroke. A usual shuttle is illustrated in broken lines as at 17.

The checking device of the present invention contemplates the use of a bracket 18 which is rigidly fastened to the lay, as by bolts not shown, such as formerly used to attach the bracket carrying the check strap to the back or rear portion of the lay 11. The bracket 18 is provided with suitable fastening means 19 in the form of a threaded bolt shank 19a and nut 19b. The elongated members A and B are constructed preferably from a high molecular weight polyethylene, such as HIFAX 1900, sold by Garland Manufacturing Company of Saco, Maine. Such synthetic polymeric material has a relatively low coefficient of friction presenting a soapy feel and avoids excessive wear on the usually wooden picker stick. Thus, it is preferred that the picker stick and the elongated checking elements A and B be constructed of compatable dissimilar material. If desired a yoke or covering of protective material may be placed about the picker stick in the area contacting the elongated checking elements.

It has been found desirable to construct the elongated member A of relatively thick stock so that a slot 20 may be provided for accommodating the bracket 18 and so that a recess 21a may be provided in the flat or planar inner face 21 for receiving the head 19c of the bolt shank 19a. The planar surface 21 on the rigidly connected elongated member A is adjacent the path traveled by the picker stick 12 and guides the picker stick on the power stroke. It has also been found expedient to provide the inner face 22 of the member B with a flat tapering surface 22a so as to receive the picker stick 12 at an angle to assist in bringing same under the influence of the checking device as soon as possible. It will be noted that the outer end of the inner surface 22 is flat as at 22b, and that the springs C normally (with the picker stick in inner position after a picking stroke) urge the member B into dotted line position in FIGURE 2. It is important to note that the spring F compresses permitting further outward movement of the member B, or at least the end adjacent thereto, upon initial contact by the picker stick 12 permitting the springs C to remain at least partially closed so as to exert a substantial checking force against the picker stick even though the inner end of the member B has been temporarily displaced outwardly.

The spring F moves the inner end of the member B against the picker stick so as to exert a uniform but increasing checking action upon the picker stick as the checking stroke progresses. The means C for resiliently urging the members toward each other includes a shank 23 which passes through eccentric pins 24 and 25 positioned in the members A and B, respectively. The eccentric pins 24 and 25 have heads 24a and 25a, respectively, and shanks or sleeves 24b and 25b, respectively. These shanks have eccentrically positioned openings 24c and 25c, respectively, therein. By turning the eccentric pins the shank or shaft 23 may be freed from any interference by the shanks 24 and 25 which acts as sleeves or bearings for carrying the shank 23 during outward and inward movement of the binder-like member B. A pair of springs 26 and 27 are carried by the portions of the shank 23 which extend transversely outside the members A and B, respectively. A washer 28 is fixed by the jam nuts 29 upon a threaded portion 23a of the shank 23. The spring 27 bears upon a washer 30 which is fixed by a second washer 31 and wing nut 32 which acts as a jam nut mounted upon a threaded portion 23b of the shank 23.

The elongated shank D passes transversely through both members adjacent the inner ends thereof. A first coil spring E is carried by said shank intermediate the members A and B urging the members to open position as illustrated in FIGURE 2. A second coil spring F is carried upon the shank outside the member B opposite the member A urging the member B against the force of the spring E. It will be observed that eccentric pins 33 and 34 position the shank D within the members A and B. The eccentric pin 33 includes a head 33a and a sleeve portion 33b. An eccentrically positioned opening 33c is provided within the sleeve for accommodating the shank D. The eccentric pin 34 has a head 34a, a shank 34b and an eccentric opening 34c for accommodating the shank D. Jam nuts 35 are positioned upon a threaded portion 35a of the shank D while a threaded portion 36 carries a wing nut 37, which bears against a washer 38, which in turn bears against a jam nut 39.

It will be noted that apertures 40 are provided in the member A. Apertures 41 are also provided in the member B. Such apertures are provided in the area where the greatest checking force is exerted to help dissipate heat developed during checking.

It will be noted, especially by reference to FIGURE 3 that the means D is positioned in a lower plane than the means C. Thus, the checking force is applied to the picker stick along a relatively wide surface thereof so as to avoid excessive wear upon a narrow area and to apply the checking force at a progressively higher point on the picker stick. The surface G tapers upwardly so as to provide a progressively greater area of contact by the picker stick with the checking means to thus increase checking action as the checking stroke progresses. During a picking stroke the resistance to inward movement progressively decrease. By making adjustments to the resilient means positioned adjacent each end of the device through the wing nuts 32 and 37 and associated parts delicate adjustments of checking force may be made through the checking stroke.

The controlled checking thus provided avoids bouncing of the shuttle during boxing and attendant disadvantages resulting in less broken picks, kinky and jerked in filling. Wear on associated loom parts is reduced and loom power consumption is reduced. Looms equipped with checking devices constructed in accordance with the present invention start better after weekend and vacation stops and are relatively unaffected by varying humidity conditions. Higher loom speeds and better work are made possible.

While a preferred embodiment of the invention has been described using specific terms, such description is for illustrative purposes only, and it is to be understood that changes and variations may be made without departing from the spirit or scope of the following claims.

What is claimed is:
1. A picker stick checking device for use in a loom having a lay including, a pair of elongated members aligned for presenting opposed inner faces for engagement with the picker stick on a checking stroke, a rigid connection between one of said elongated members and the lay, resilient means for yieldably urging the outer end of the other elongated member toward the outer end of said one elongated member and for resisting lateral outward displacement of the inner end of said one elongated member, an inwardly tapering inner face portion carried adjacent the inner end of said other elongated member, and a planar surface on said rigidly connected elongated member adjacent the path traveled by said picker stick for guiding said picker stick on a power stroke.

2. A picker stick checking device as set forth in claim 1, wherein the opposed inner faces of said elongated members are constructed through a substantial portion of their length of a synthetic polymeric material having a relatively low coefficient of friction.

3. A picker stick checking device for use in a loom having a lay including, a pair of elongated members carried by the lay aligned for presenting opposed inner faces for engaging the picker stick on a checking stroke, first resilient means yieldably urging the outer ends of said members toward each other carried adjacent said outer ends, second resilient means for resisting relative lateral outward displacement of the inner ends of said elongated members carried adjacent said inner ends, and one of said elongated members presenting a face of progressively diminishing height from the inner toward the outer ends thereof so as to provide a progressively greater area of contact with the picker stick as the checking stroke progresses.

4. A picker stick checking device for a loom having a lay including, a pair of elongated members aligned for presenting opposed inner faces, resilient means yieldably urging the outer ends of said members toward each other carried adjacent said outer ends normally urging said outer ends into closed position, one of said members having rigid connection with the lay, an elongated element passing transversely through both members adjacent the inner ends thereof, a first coil spring carried by said element intermediate said members urging said inner ends of said members into open position, and a second coil spring carried upon the element outside the member opposite the member having fixed connection with the lay urging said member opposite against the force of the first soil spring, whereby more uniform checking action is accomplished at higher loom speeds.

5. A picker stick checking device for a loom having a lay including, a pair of elongated members constructed of a synthetic polymeric material having a relatively low coefficient of friction presenting opposed inner faces, means resiliently urging the outer ends of said members toward each other, one of said members having rigid connection with the lay, an elongated shank passing transversely through both members adjacent the inner ends thereof, a first coil spring carried by said shank intermediate said members urging said members to open position, and a second coil spring carried upon the shank outside the member opposite the member having fixed connection with the lay urging said member opposite against the force of the first coil spring, whereby more even checking action is achieved.

6. A picker stick checking device as set forth in claim 5, wherein said shank is positioned substantially below the horizontal plane of the means resiliently urging, a second elongated shank passing transversely through both members adjacent the outer ends thereof carrying said means resiliently urging the outer ends toward each other, and eccentric sleeves mounted within said elongated members carrying said shanks for slidable movement therein.

7. A checking apparatus for a shuttle propelling device for use in a loom having a lay including, a pair of elongated members aligned for engaging the shuttle propelling device on a checking stroke, first resilient means yieldably urging the outer ends of said members toward each other carried adjacent said outer ends, second resilient means resisting relative lateral outward displacement of the inner ends of said elongated members carried adjacent said inner ends, a rigid connection between one of said elongated members and the lay maintaining said one of said elongated members in a fixed position relative to the lay, and a planar surface on said rigidly connected elongated member adjacent the path traveled by said shuttle propelling device for guiding said shuttle propelling device on a power stroke.

8. A picker stick checking device for use in a loom having a lay including, a pair of elongated members carried by the lay aligned for presenting opposed inner faces for engaging the picker stick on a checking stroke, a first resilient means yieldably urging the outer ends of said members toward each other carried adjacent said outer ends, second resilient means maintaining the inner ends of said elongated members in open position to receive the picker stick for a checking stroke but for resisting relative lateral outward displacement of said inner ends, said inner faces of said elongated members being constructed through a substantial portion of their length of a synthetic polymeric material having a relatively low coefficient of friction, one of said elongated members having a fixed connection with the lay, the other of said elongated members having an inner face adjacent the inner end thereof which tapers from the inner end toward said one of said elongated members, means adjusting the first resilient means to vary the extent to which said outer ends are urged together, and means adjusting the second resilient means to vary the relative position of said inner ends with respect to each other, whereby the effective length of the checking stroke is varied and whereby the checking action exerted during any part of the stroke may be varied.

References Cited by the Examiner

UNITED STATES PATENTS

| 591,122 | 10/1897 | Wright | 139—164 |
|---|---|---|---|
| 1,138,660 | 5/1915 | Jones et al. | 139—164 |
| 1,146,697 | 7/1915 | Evans | 139—164 |
| 1,200,846 | 10/1916 | Jones | 139—164 |
| 1,707,851 | 4/1929 | Galle | 139—164 X |
| 2,197,589 | 4/1940 | Newton | 139—164 |
| 2,557,023 | 6/1951 | Ashton et al. | 139—164 |
| 2,646,082 | 7/1953 | Franklin et al. | 139—164 |

FOREIGN PATENTS 567,192   10/1958   Belgium.

MERVIN STEIN, *Primary Examiner.*

DONALD W. PARKER, *Examiner.*

J. KEE CHI, *Assistant Examiner.*